Jan. 24, 1928.

A. N. ARMSTRONG

ELECTRIC STEAM GENERATOR

Filed Feb. 10, 1926

WITNESS
H. Furst.

INVENTOR
Arthur N. Armstrong
BY Edison Thompson
ATTORNEYS

Jan. 24, 1928.
A. N. ARMSTRONG
1,657,144
ELECTRIC STEAM GENERATOR
Filed Feb. 10, 1926        2 Sheets-Sheet 2
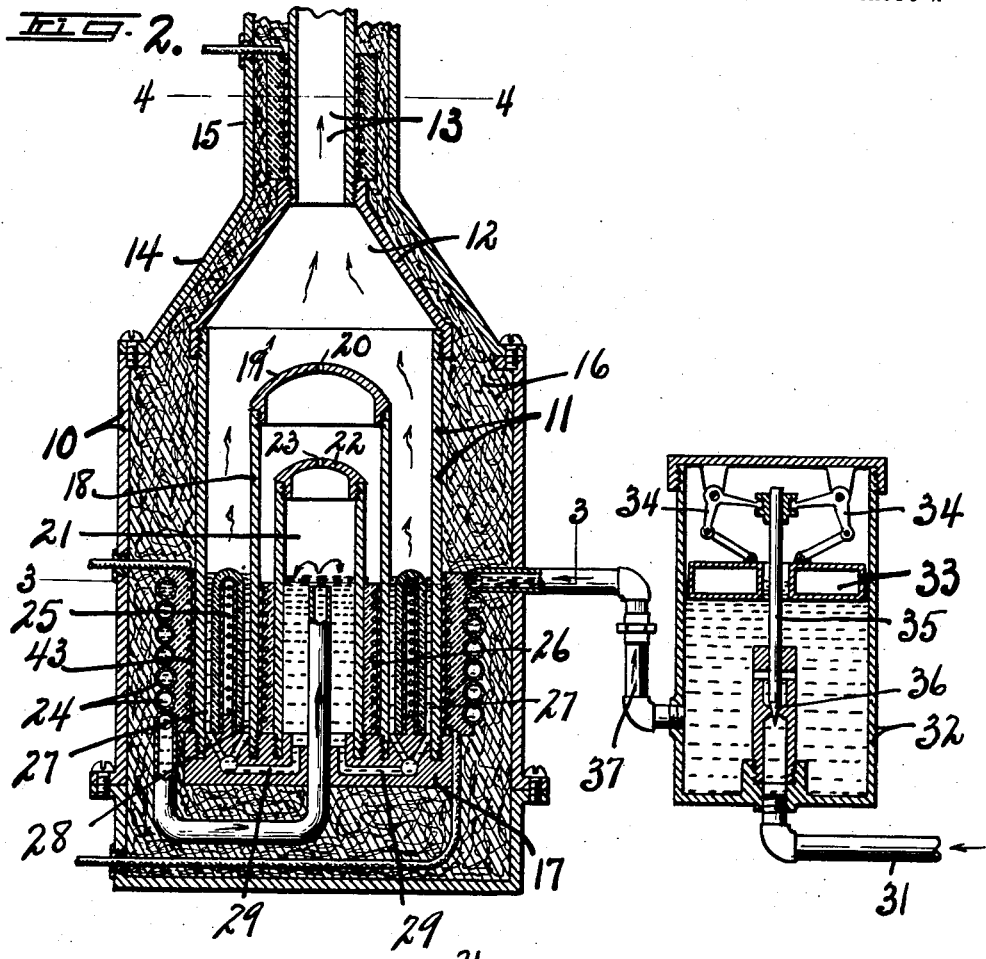
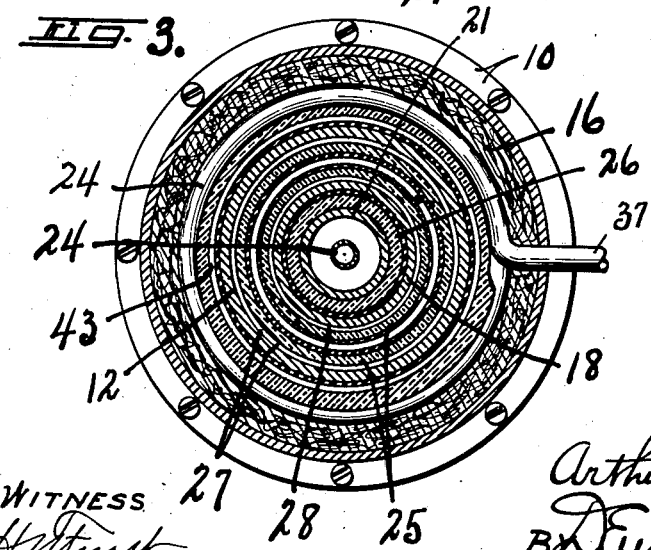
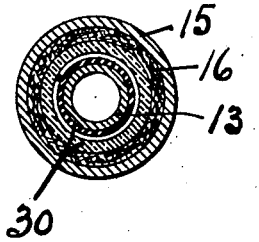
WITNESS
H. V. Furst.
INVENTOR
Arthur N. Armstrong
By Edison Thompson
ATTORNEYS Patented Jan. 24, 1928.

1,657,144

UNITED STATES PATENT OFFICE.

ARTHUR N. ARMSTRONG, OF NORWICH, NEW YORK, ASSIGNOR OF ONE-HALF TO HERMAN J. SOMMERS, OF NORWICH, NEW YORK.

ELECTRIC STEAM GENERATOR.

Application filed February 10, 1926. Serial No. 87,366.

This invention relates to certain new and useful improvements in electric steam generators adapted for many and various uses, as for instance supplying steam to a radiator for heating purposes.

The main object of the invention is the production of an apparatus for generating steam in an efficient and comparatively inexpensive manner, the water supplied to the steam generator proper being controlled and regulated by and in accordance with the capacity of the apparatus for changing the same to steam.

Other objects and advantages relate to the details of the structure and the association and arrangement of the parts thereof, all as will more fully appear from the following description taken in connection with the accompanying drawings, in which:

Figure 2 is a section through the steam generator and the water supply regulator.

Figure 3 is a section on line 3—3, Figure 2.

Figure 4 is a section on the line 4—4, Figure 2.

Figure 1:
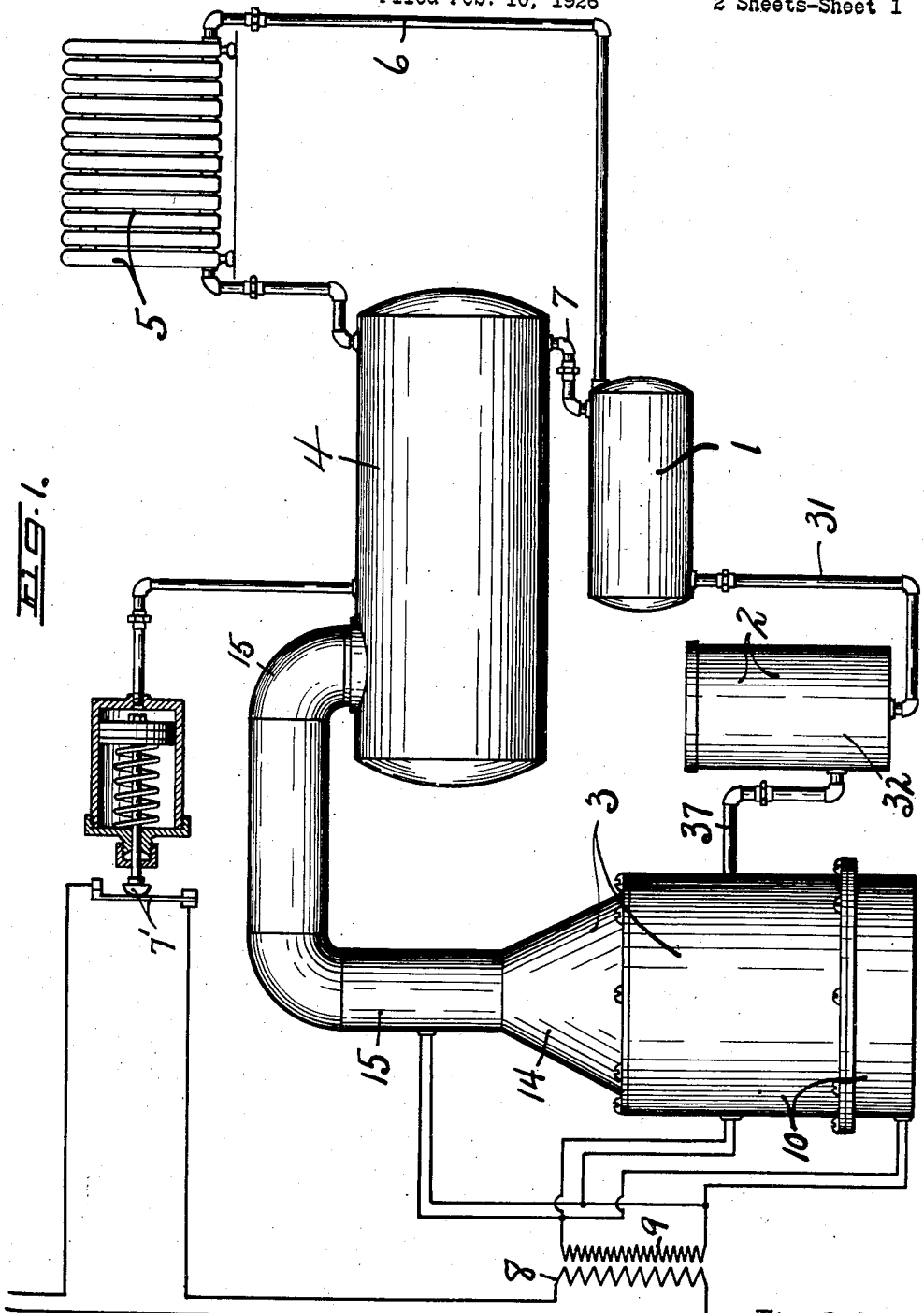
Figure 1 is an elevation partly in section of an embodiment of my invention.

The apparatus as generally outlined in Figure 1 comprises a water supply tank —1—, a water supply regulator —2—, a steam generator —3—, a steam chest —4— and an apparatus for utilizing the steam such as the radiator —5—, return connections —6— and —7— leading from the steam chest and from the radiator to the water supply tank for returning condensation to the water supply tank, a pressure-actuated automatic switch 7' being provided for making or breaking the circuit to the primary —8— of a transformer in accordance with the pressure in the steam chest —4—, the secondary —9— of the transformer being connected to the electric heating elements hereinafter described.

The steam generator as best illustrated in Figures 2 to 4 comprises a pair of concentric spaced cup-shape shells —10— and —11—. The inner shell —11— is formed with a tapered dome —12— leading to an exit pipe —13— for steam, which pipe is connected to the steam chest —4—. The outer shell —10— is likewise provided with a tapered dome —14— conforming in shape with the dome —12— but of somewhat larger size and spaced therefrom and terminating in a tube —15— surrounding and spaced from the tube —13—. The space between the shells —10— and —11— between the domes —12— and —14— and the tubes —13— and —15— is substantially filled with heat insulation material —16—, such as asbestos. Within the shell —11— and spaced therefrom and secured in any suitable manner to the base —17— of the shell is a cylinder —18— provided at its top with a cap —19— formed with one or more openings —20— permitting the passage of vapor to the interior of the shell, and within the cylinder —18— there is arranged a second cylinder —21— of somewhat smaller diameter and connected to the base —17— in any suitable manner as by threading, for support thereby.

The upper end of cylinder —21— is provided with a cap —22— having one or more openings —23— for the passage of vapor to the interior of the cylinder —18—. The space within the cylinder —21— constitutes the water chamber of the steam generator. Preferably the shells and cylinders are all arranged concentrically as illustrated. Within the space between the shells —10— and —11— near the lower end of the shell —11— there is provided an electric heating element —43—, the exterior insulation of which is preferably grooved for the reception of a coiled pre-heater pipe —24— which is carried down beneath the base —17— radially across the base to substantially the center thereof where it extends upwardly through the base and into the water chamber within the cylinder —21—, preferably to a point adjacent the desired elevation of water therein.

Within the chamber between the shell —11— and the cylinder —18— is arranged a cylindrical heating element —25—. This element is arranged concentric with the shell and the cylinder and is preferably spaced equal distances from each, and the space between the shell and the cylinder is of such a radial width that when the electric heating element —25— is inserted and secured therein, two narrow water chambers, preferably extremely narrow and in accordance with the heating capacity of the heating elements, are formed between the heating element and the shell, and between the heating element and the cylinder.

These water chambers are of annular form and permit the passage upwardly of two concentric annular channels of water over the heating element —25—.

In addition a third heating element —26— is disposed between the cylinder —18— and the cylinder —21— so as to heat the walls of the cylinders with which the water is in contact. Communication is had between the water chamber within cylinder —21— and the annuler water chambers or spaces —27— and —28— through the medium of a passageway —29— extending through the base —17— and branching into two passageways leading to the respective water areas or spaces.

In addition, a fourth heating element —30— is disposed around the lower end of the tube or pipe —13— so that additional heat may be supplied to the steam or vapor which arises to this point in the steam generator for supply to the steam chest —4—.

The water contained in tank —1— is carried through pipe —31— to the bottom of the water supply regulator —2— which consists of a tank —32— containing float —33— which through the medium of levers —34— and links connecting the levers to the float actuates the valve stem —35— carrying valve —36— which controls the entry of water from the water supply tank to the water supply regulator. The level of the water in the tank —32— is the same as the level of the water in the steam generator —3— and water will be supplied to the tank —32— in amount sufficient to maintain the required level in the steam generator and in accordance with the capacity of the apparatus for changing the water into steam.

The pipe —37— leads from the water supply regulator to the pre-heater coil —23— and supplies the required amount of water thereto, and this water is pre-heated by the heater —24— preliminary to its discharge into the water chamber formed by cylinder —21—.

The water flows from the water chamber through passageways —29— to the narrow annular water areas —27— and —28— where the water comes in contact with the heating elements while flowing in film form upwardly through said areas, and is thereby rapidly heated and changed to steam. As the water vaporizes, additional water to maintain substantially a pre-determined level is supplied to the water areas of the steam generator so that the supply of water is substantially equal to the capacity of the generator for changing the water into steam.

When a predetermined pressure of steam has been reached in the chest —4—, the circuit to the primary —8— of the transformer is broken and the operation of the steam generator ceases until such time as pressure in the chest reaches a point where the switch again automatically closes.

The operation of the apparatus will be well understood from the above, and altho I have shown a specific construction of apparatus, together with details of the parts and the relation thereof, I do not desire to restrict myself to the specific form of the apparatus or to the details of the structure as here disclosed, as various changes and modifications may be made within the scope of the appended claims.

I claim:

1. An electric steam generator comprising a steam generating chamber, a casing surrounding the steam generating chamber and spaced therefrom, heat insulating material in the space between the casing and the chamber wall, a pre-heating coil in said space, a water chamber within the steam generating chamber, and means of communication between the pre-heating coil and the water chamber.

2. An electric steam generator comprising a steam generating chamber, a casing surrounding the steam generating chamber and spaced therefrom, heat insulating material in the space between the casing and the chamber wall, a pre-heating coil in said space, a water chamber within the steam generating chamber, means of communication between the pre-heating coil and the water chamber, narrow water areas in said steam generating chamber, an electric heating element for heating water in said water areas, and means of communication between the water chamber and said narrow water areas.

3. An electric steam generator comprising a steam generating chamber, a casing surrounding the steam generating chamber and spaced therefrom, heat insulating material in the space between the casing and the chamber wall, a pre-heating coil in said space, a water chamber within the steam generating chamber, means of communication between the pre-heating coil and the water chamber, narrow water areas in said steam generating chamber, an electric heating element for heating water in said water areas, means of communication between the water chamber and said narrow water areas, and means for regulating the level of the water in said chamber and water areas in accordance with the capacity of the electric heating element for changing water in said water areas to steam.

4. An electric steam generator comprising a steam generating chamber, a casing surrounding the steam generating chamber and spaced therefrom, heat insulating material in the space between the casing and the chamber wall, a preheating coil in said space, a water chamber within the steam generating chamber, means of communication between the pre-heating coil and the water chamber, narrow annular water areas concentric with the water chamber, an electric heating element for heating water in said water areas, and means of communication between the water chamber and said narrow water areas.

5. An electric steam generator comprising a water chamber, an electric heating element surrounding said water chamber, a casing surrounding said electric heating element and forming one wall of a steam generating chamber, an outside wall of said steam generating chamber, a second electric heating element disposed in said steam generating chamber, narrow water ways between said last-named electric heating element and the walls of said steam generating chamber, means of communication between said water ways and said water chamber, another electric heating element surrounding the outside wall of said steam generating chamber, a water passage adjacent said last named electric heating element, and in communication with said water chamber, heat insulating means disposed around said last named water passage, and an outside casing surrounding said heat insulating means.

6. In a device as described in claim 5, means for regulating the level of the water in said chamber and water areas in accordance with the capacity of the electric heating elements for changing water in said water areas to steam.

7. In a device as described in claim 5, means for cutting off the supply of current to the heating element when a pre-determined steam pressure has been reached.

In witness whereof I have hereunto set my hand this twenty-third day of January, 1926.

ARTHUR N. ARMSTRONG.